United States Patent [19]

Kricheldorf et al.

[11] Patent Number: 5,134,219
[45] Date of Patent: Jul. 28, 1992

[54] STIFF-CHAIN POLYHETEROCYCLES HAVING IMPROVED SOLUBILITY, A PROCESS FOR THEIR PRODUCTION AND THEIR USE

[75] Inventors: Hans R. Kricheldorf; Jürgen Engelhardt, both of Hamburg; Ralf Pakull, Krefeld; Volker Eckhardt, Krefeld; Ulrich Leyrer, Leverkusen, all of Fed. Rep. of Germany

[73] Assignee: Bayer Aktiengesellschaft, Leverkusen, Fed. Rep. of Germany

[21] Appl. No.: 617,690

[22] Filed: Nov. 26, 1990

[30] Foreign Application Priority Data

Dec. 9, 1989 [DE] Fed. Rep. of Germany ....... 3940792

[51] Int. Cl.$^5$ ........................ C08G 75/00; C08G 75/32
[52] U.S. Cl. ...................................... 528/183; 528/186; 528/337
[58] Field of Search ................. 525/58; 528/186, 183, 528/337

[56] References Cited

U.S. PATENT DOCUMENTS

| | | | |
|---|---|---|---|
| 4,835,246 | 5/1989 | Tsai et al. | 528/183 |
| 4,892,921 | 1/1990 | Tsai et al. | 528/183 |
| 4,910,293 | 3/1990 | Vekita et al. | 528/186 |
| 5,001,217 | 3/1991 | Tsai et al. | 528/186 |

FOREIGN PATENT DOCUMENTS 1-256534  10/1989  Japan ................... 528/183

OTHER PUBLICATIONS

Abstract CA115(26):280694x.

*Primary Examiner*—James J. Seidleck
*Assistant Examiner*—W. R. H. Clark
*Attorney, Agent, or Firm*—Connolly & Hutz

[57] ABSTRACT

The substituted polyheterocycles containing recurring structural units corresponding to the formula

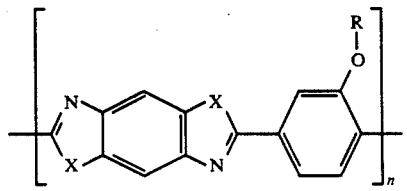

and/or

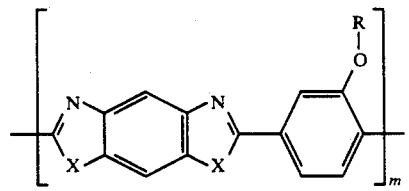

in which X is an oxygen atom, a sulfur atom or N-H, show good solubility in mixtures of methanesulfonic acid and methylene chloride or trifluoroacetic acid and methylene chloride. They may be used for the production of mixtures with thermoplastic polymers.

1 Claim, No Drawings

STIFF-CHAIN POLYHETEROCYCLES HAVING IMPROVED SOLUBILITY, A PROCESS FOR THEIR PRODUCTION AND THEIR USE

This invention relates to stiff-chain substituted polyheterocycles and to their production. The substituted polyheterocycles according to the invention show good solubility in mixtures of trifluoroacetic acid and methylene chloride and may therefore be used with advantage for the production of mixtures with thermoplastic polymers.

Stiff-chain methyl- or dimethyl-substituted polyheterocycles are known (cf. for example Polym. Prep. Am. Chem. Soc., Div. Polym. Chem. 29 (1988) 2, 324–325). The solubility of these substituted polyheterocycles is limited to strong acids, such as concentrated sulfuric acid. Since they do not melt at temperatures below 400° C., they are not suitable for the production of mixtures with thermoplastic polymers.

Accordingly, the problem addressed by the present invention was to provide polyheterocycles having improved solubility.

It has now been found that certain stiff-chain substituted polyheterocycles dissolve in mixtures of methane sulfonic acid and methylene chloride or of trifluoroacetic acid and methylene chloride. By virtue of the stiffness of their chain, they are suitable for the production of mixtures with thermoplastic polymers. The production of mixtures of polyheterocycles and thermoplastic polymers is thus considerably simplified.

Accordingly, the present invention relates to substituted polyheterocycles containing recurring units corresponding to formula (I) and/or (II)

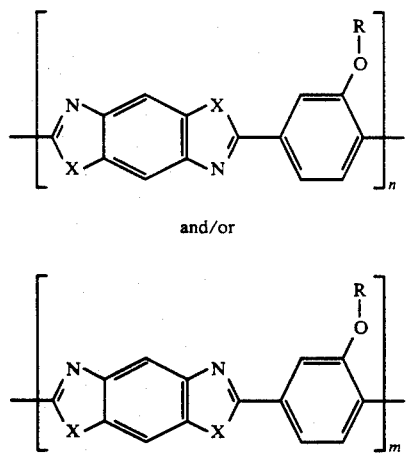

and/or in which

R is an aryl radical containing 6 to 18 carbon atoms, a p-alkylphenyl radical containing 1 to 15 aliphatic carbon atoms, a phenyl alkylene radical containing 6 to 18 aromatic carbon atoms and 1 to 15 aliphatic carbon atoms, a p-halophenyl radical, a p-$C_{6-10}$-aryloxyphenyl radical containing 12 to 24 carbon atoms, an alkoxyphenyl radical containing 7 to 18 aliphatic carbon atoms or an indanyl radical which may be substituted by 1 to 8 aliphatic groups or halogen atoms; the R's on each ring independently may be the same or different, X is an oxygen atom, a sulfur atom or N-H and n, m independently of one another represent an integer of 3 to 1,000.

Examples of aryl radicals are those containing 6 to 18 carbon atoms, such as phenyl, biphenyl, terphenyl, anthracenyl or naphthyl, preferably phenyl and biphenyl; examples of p-alkylphenyl radicals are those containing 1 to 15 aliphatic carbon atoms, such as p-methylphenyl, p-ethylphenyl, p-tert.-butylphenyl, p-tert.-amylphenyl, p-isooctylphenyl, preferably p-tert.-butylphenyl, p-tert.amylphenyl and p-isooctylphenyl; examples of phenyl alkylene radicals are those containing 1 to 15 aliphatic carbon atoms and 6 to 18 aromatic carbon atoms, such as methylene phenyl and isopropylidene phenyl; examples of p-halophenyl radicals are p-fluorophenyl, p-chlorophenyl, p-bromophenyl, p-chlorobiphenyl, preferably p-chlorophenyl and p-bromophenyl; examples of p-aryloxyphenyl radicals are those containing 12 to 24 carbon atoms, such as p-phenoxyphenyl, p-biphenyloxyphenyl, p-naphthoxyphenyl, preferably p-phenoxyphenyl; examples of p-alkoxyphenyl radicals are those containing 7 to 18 aliphatic carbon atoms, such as p-methoxyphenyl, p-ethoxyphenyl, p-tert.-butyloxyphenyl, preferably p-methoxyphenyl and p-tert.-butyloxyphenyl; and examples of indanyl radicals are those containing up to 8 aliphatic substituents or those substituted by up to 8 halogen atoms, such as indane, 1,1,3,3-tetramethyl indane and 2,2,3,3-tetramethyl indane, preferably 1,1,3,3-tetramethyl indane.

Preferred halogens are Fl, Cl, Br.

The stiff-chain substituted polyheterocycles according to the invention may be produced analogously to known methods in polyphosphoric acid (cf. for example J. Polym. Sci., 50, 511 (1961), U.S. application Ser. No. 313,783) or by melt condensation (cf. for example U.S. application Ser. No. 3,174,947).

The melt condensation may optionally be followed, for example, by post-condensation in the solid phase (cf. for example U.S. application Ser. No. 3,509,108).

The stiff-chain substituted polyheterocycles according to the invention may be produced, for example, from silylated 2,5-diaminohydroquinone or silylated 2,4-diaminoresorcinol (cf. for example USSR-A 663 699). The stiff-chain substituted polyheterocycles according to the invention are preferably produced from silylated 2,5-diaminohydroquinone or silylated 2,4-diaminoresorcinol.

By virtue of their properties, the stiff-chain substituted polyheterocycles according to the invention may be used with advantage for the production of mixtures with thermoplastic polymers (matrix polymer) in a ratio of 0.01 to 0.6:0.99 to 0.40, preferably in a ratio of 0.05 to 0.40:0.95 to 0.60 and more preferably in a ratio of 0.05 to 0.20:0.45 to 0.80. Accordingly, the present invention also relates to mixtures of the stiff-chain substituted polyheterocycles according to the invention with thermoplastic polymers.

Examples of thermoplastic polymers which may be used as components of these mixtures are polyacrylonitrile or a derivative/copolymer thereof; polyamides, such as polyamide 6, polyamide 66 or a derivative/copolymer thereof; polyesters, such as polyethylene terephthalate or polybutylene terephthalate or a derivative/copolymer thereof; polyurethanes or a derivative/copolymer thereof; polyalkylenes, such as polyethylene or polypropylene or a derivative/copolymer thereof; polycarbonates or a derivative/- copolymer thereof; polyacetals or a derivative/copolymer thereof; polysulfones or a derivative/copolymer thereof; polysulfides, such as polyphenylene sulfide, or a derivative/copolymer thereof; vinyl polymers, such as polyvinyl chloride, polyvinylidene chloride or polyvinyl pyrrolidone or a derivative/copolymer thereof; polymethyl methacrylate or a derivative/copolymer thereof; polystyrene or a derivative/copolymer thereof; polyvinyl alcohol or a derivative/copolymer thereof; and styrene-butadiene block copolymers or a derivative/copolymer thereof, etc.

The stiff-chain substituted polyheterocycles according to the invention may also be mixed with several flexible thermoplastics.

The mixtures according to the invention may contain typical additives, such as flow aids and mold release agents; fillers and reinforcing materials, such as talcum, chalk and glass fibers, organic fibers; pigments, such as titanium dioxide and carbon black; flameproofing agents, such as halogen compounds, antimony trioxide; and stabilizers, such as low molecular weight phosphites, etc.

These typical additives may be incorporated in the mixtures in quantities of from 0.001 to 400% by weight.

The mixtures according to the invention may be used for the production of moldings, fibers, filaments and films.

EXAMPLES

Example 1

The following substances were weighed into a 250 ml three-necked flask equipped with a gas inlet and outlet and a stirrer:
- 17.16 g (0.04 mol) 1,2,4,5-tetra-(trimethylsilyl)-diaminohydroquinone
- 16.53 g (0.04 mol) p-(isopropylphenyl)-phenoxyterephthalic acid dichloride
- 80 ml Marlotherm S The reaction mixture was slowly heated under nitrogen with stirring to 350° C. The trimethyl chlorosilane or hexamethyl disiloxane formed was driven off with a gentle stream of nitrogen, followed by stirring for another 3 hours. After cooling, the product was filtered off, washed with acetone and dioxane and dissolved in a mixture of methanesulfonic acid/methylene chloride. After precipitation in methanol, the product was dried in vacuo at 120° C.

Example 2

The following substances were weighed into a 500 ml three-necked flask equipped with a gas inlet and outlet and a stirrer:
- 17.16 g (0.04 mol) 1,2,4,5-tetra-(trimethylsilyl)-diaminohydroquinone
- 15.49 g (0.04 mol) p-(phenoxy)-phenoxyterephthalic acid dichloride
- 200 ml N-methylpyrolidon.

A concentrated, cooled solution of the p-(phenoxy)-phenoxyterephthalic acid dichloride was added under nitrogen with stirring to the solution of the 1,2,4,5-tetra(trimethylsilyl)-diaminohydroquinone in N-Methylpyrolidon. The solution was stirred for 8 h at −5° C. and then for another 72 h at room temperature. The resulting solution was poured into 2 l methanol containing 100 ml 1 N hydrochloric acid. The product was filtered off and washed with methanol and dioxane. After drying, the product was suspended in Marlotherm S and cyclized to the poly-bis-benzoxazole by heating for 3 h at 350° C.

Example 3

The following substances were weighed into a 250 ml three-necked flask equipped with a gas inlet and outlet and a stirrer:
- 17.16 g (0.04 mol) 1,2,4,5-tetra-(trimethylsilyl)-diaminohydroquinone
- 15.49 g (0.04 mol) p-(phenoxy)-phenoxyterephthalic acid dichloride
- 80 ml Marlotherm S The reaction mixture was slowly heated under nitrogen with stirring to 350° C. The trimethyl chlorosilane or hexamethyl disiloxane formed was driven off with a gentle stream of nitrogen, followed by stirring for another 3 hours. After cooling, the product was filtered off, washed with acetone and dioxane and dissolved in a mixture of methanesulfonic acid/methylene chloride. After precipitation in methanol, the product was dried in vacuo at 120° C.

Example 4

The following substances were weighed into a 250 ml three-necked flask equipped with a gas inlet and outlet and a stirrer:
- 17.16 g (0.04 mol) 1,2,4,5-tetra-(trimethylsilyl)-diaminohydroquinone
- 6.58 g (0.02 mol) p-(chlorophenoxy)-terephthalic acid dichloride
- 7.42 g (0.02 mol) p-(phenyl)-phenoxyterephthalic acid dichloride
- 80 ml Marlotherm S The reaction mixture was slowly heated under nitrogen with stirring to 350° C. The trimethyl chlorosilane or hexamethyl disiloxane formed was driven off with a gentle stream of nitrogen, followed by stirring for another 3 hours. After cooling, the product was filtered off, washed with acetone and dioxane and dissolved in a mixture of methanesulfonic acid/methylene chloride. After precipitation in methanol, the product was dried in vacuo at 120° C.

Example 5

The following substances were weighed into a 250 ml three-necked flask equipped with a gas inlet and outlet and a stirrer:
- 25.73 g (0.06 mol) 1,2,4,5-tetra-(trimethylsilyl)-diaminohydroquinone
- 8.27 g (0.02 mol) p-(isopropylphenyl)-phenoxyterephthalic acid dichloride
- 7.42 g (0.02 mol) p-(phenyl)-phenoxyterephthalic acid dichloride
- 7.48 g (0.02 mol) p-bromophenoxyterephthalic acid dichloride
- 120 ml Marlotherm S The reaction mixture was slowly heated under nitrogen with stirring to 350° C. The trimethyl chlorosilane or hexamethyl disiloxane formed was driven off with a gentle stream of nitrogen, followed by stirring for another 3 hours. After cooling, the product was filtered off, washed with acetone and dioxane and dissolved in a mixture of methanesulfonic acid/methylene chloride. After precipitation in methanol, the product was dried in vacuo at 120° C.

Example 6

The following substances were weighed into a 250 ml three-necked flask equipped with a gas inlet and outlet and a stirrer:

- 17.16 g (0.04 mol) 1,2,4,5-tetra-(trimethylsilyl)-diaminohydroquinone
- 19.10 g (0.04 mol) 2,5-di-(3-phenylpropoxy)-terephthalic acid dichloride
- 120 ml Marlotherm S The reaction mixture was slowly heated under nitrogen with stirring to 350° C. The trimethyl chlorosilane or hexamethyl disiloxane formed was driven off with a gentle stream of nitrogen, followed by stirring for another 3 hours. After cooling, the product was filtered off, washed with acetone and dioxane and dissolved in a mixture of methanesulfonic acid/methylene chloride. After precipitation in methanol, the product was dried in vacuo at 120° C.

Example 7

The following substances were weighed into a 250 ml three-necked flask equipped with a gas inlet and outlet and a stirrer:

- 18.44 g (0.04 mol) 1,2,4,5-tetra-(trimethylsilyl)-1,4-dimercapto-2,5-diaminobenzene
- 16.53 g (0.04 mol) p-(isopropylphenyl)-phenoxyterephthalic acid dichloride
- 120 ml Marlotherm S The reaction mixture was slowly heated under nitrogen with stirring to 350° C. The trimethyl chlorosilane or hexamethyl disiloxane formed was driven off with a gentle stream of nitrogen, followed by stirring for another 3 hours. After cooling, the product was filtered off, washed with acetone and dioxane and dissolved in a mixture of methanesulfonic acid/methylene chloride. After precipitation in methanol, the product was dried in vacuo at 120° C.

We claim:

1. Substituted polyheterocycles containing recurring units corresponding to

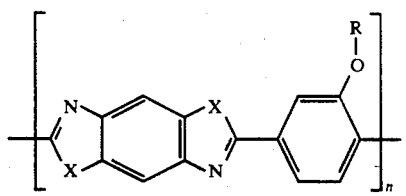

and/or

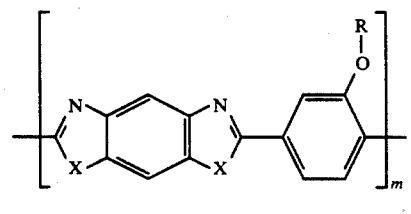

in which

R is an aryl radical containing 6 to 18 carbon atoms, a p-alkylphenyl radical containing 1 to 15 aliphatic carbon atoms, a phenyl alkylene radical containing 6 to 18 aromatic carbon atoms and 1 to 15 aliphatic carbon atoms, a p-halophenyl radical, a p-aryloxyphenyl radical containing 12 to 24 carbon atoms, a p-alkoxyphenyl radical containing 7 to 18 aliphatic carbon atoms or an indanyl radical which may be substituted by 1 to 8 aliphatic groups or halogen atoms; the R's on each ring independently may be the same or different, X is an oxygen atom, a sulfur atom or N-H and n, m independently of one another represent an integer of 3 to 1,000.

* * * * *

| | Yield and properties of the substituted poly-bis-benzoxazoles of Examples 1 to 7 | | | | | | |
|---|---|---|---|---|---|---|---|
| Example | Yield (%) | $\eta_{inh}$[1] (dl/g) | Empirical formula (molecular weight) | | Elemental analysis | | |
| | | | | | C | H | N |
| 1 | 97 | 1.18 | $C_{29}H_{20}N_2O_3$ | calc.: | 78.36 | 4.53 | 6.30 |
| | | | (444.49) | found: | 77.05 | 4.54 | 6.10 |
| 2 | 89 | 0.88 | $C_{26}H_{14}N_2O_4$ | calc.: | 74.64 | 3.37 | 6.70 |
| | | | (418.41) | found: | 74.76 | 3.70 | 6.24 |
| 3 | 96 | 0.95 | $C_{26}H_{14}N_2O_4$ | calc.: | 74.64 | 3.37 | 6.70 |
| | | | (418.41) | found: | 74.57 | 3.45 | 6.55 |
| 4 | 92 | 0.94 | $C_{46}H_{23}ClN_4O_6$ | calc.: | 72.40 | 3.04 | 7.34 |
| | | | (763.16) | found: | 71.25 | 3.27 | 6.93 |
| 5 | 90 | 0.96 | $C_{75}H_{43}BrN_6O_9$ | calc.: | 71.94 | 3.46 | 6.71 |
| | | | (1252.11) | found: | 71.40 | 3.56 | 6.79 |
| 6 | 85 | 1.20 | $C_{32}H_{26}N_2O_4$ | calc.: | 76.48 | 5.21 | 5.57 |
| | | | (502.57) | found: | 75.19 | 5.21 | 5.60 |
| 7 | 89 | 1.78 | $C_{29}H_{20}N_2OS_2$ | calc.: | 73.08 | 4.23 | 5.88 |
| | | | (476.62) | found: | 72.71 | 4.45 | 6.10 |

[1] as measured in methanesulfonic acid/methylene chloride (1:4 parts by volume) at a concentration of 2 g/l and T = 25° C.